United States Patent
Jung et al.

(10) Patent No.: US 8,463,180 B2
(45) Date of Patent: Jun. 11, 2013

(54) METHOD AND SYSTEM FOR PERFORMING PEER-TO-PEER COMMUNICATIONS IN A COMMUNICATION SYSTEM

(75) Inventors: Young-Ho Jung, Suwon-si (KR); Sang-Min Lee, Seoul (KR); Myeon-Kyun Cho, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 588 days.

(21) Appl. No.: 12/178,401

(22) Filed: Jul. 23, 2008

(65) Prior Publication Data
US 2009/0046683 A1 Feb. 19, 2009

(30) Foreign Application Priority Data
Aug. 3, 2007 (KR) .................. 10-2007-0078320

(51) Int. Cl.
*H04B 5/00* (2006.01)
*H04B 7/00* (2006.01)

(52) U.S. Cl.
USPC ..... 455/41.1; 455/41.2; 455/41.3; 455/426.1; 455/445; 455/519

(58) Field of Classification Search
USPC .................. 455/41.1, 41.2, 426.1, 445, 519
See application file for complete search history.

(56) References Cited

U.S. PATENT DOCUMENTS

| | | | | |
|---|---|---|---|---|
| 7,453,853 | B2* | 11/2008 | Haartsen | 455/41.2 |
| 7,684,813 | B2* | 3/2010 | Benson et al. | 455/41.2 |
| 2006/0079256 | A1* | 4/2006 | Kim | 455/509 |

* cited by examiner

*Primary Examiner* — Wen Huang
(74) *Attorney, Agent, or Firm* — Jefferson IP Law, LLP

(57) ABSTRACT

A method and system for performing P2P communications in a communication system are provided, in which a first MS transmits a request signal requesting P2P communications with a second MS and a unique identification number of the second MS to a BS, receives from the BS a CID of the second MS allocated by the BS and transmission information required for initial synchronization of the P2P communications in response to the request signal, acquires synchronization with the second MS using the CID of the second MS and the transmission information, and establishes a P2P connection with the second MS.

18 Claims, 6 Drawing Sheets

METHOD AND SYSTEM FOR PERFORMING PEER-TO-PEER COMMUNICATIONS IN A COMMUNICATION SYSTEM

PRIORITY

This application claims the benefit under 35 U.S.C. §119 (a) of a Korean patent application filed in the Korean Intellectual Property Office on Aug. 3, 2007 and assigned Serial No. 2007-78320, the entire disclosure of which is hereby incorporated by reference.

BACKGROUND OF THE INVENTION

1. Field of the Invention

The present invention relates to a method and system for performing Peer-To-Peer (P2P) communications in a communication system. More particularly, the present invention relates to a method and system for performing P2P communications in a cellular communication system.

2. Description of the Related Art

In a communication system, there are, by and large, two communication modes for communications between a transmitting MS, i.e. a source MS (MS_S) and a receiving MS, i.e. a destination MS (MS_D). The two communication modes are a cellular communication mode and a P2P communication mode. In the cellular communication mode, MS_S communicates with MS_D via a Base Station (BS), whereas in the P2P communication mode, MS_S communicates directly with MS_D without the aid of the BS.

A cellular-mode MS establishes a P2P connection to operate in the P2P communication mode. With reference to FIG. 1, a conventional operation for establishing the P2P connection by the cellular-mode MS will be described in the context of Bluetooth communications as an example. In FIG. 1, MS_S requesting P2P connection setup is referred to as a first device and MS_D to which a P2P connection is to be established with is referred to as a second device. The first and second devices exchange signals via a radio interface.

FIG. 1 illustrates a conventional operation for establishing a P2P connection using Bluetooth by a cellular-mode MS.

Referring to FIG. 1, a first device 101 transmits its 48-bit unique Bluetooth Device ADDRess (BD_ADDR) 113 to a second device 103 via wireless interface 105. A random number generator 107 of the second device 103 generates a 128-bit Authentication RANDom number (AU_RAND) 115 and transmits it to the first device 101 via wireless interface 105.

The first and second devices 101 and 103 generate authentication response strings (SRESs) using the BD_ADDR 113, the AU_RAND 115, and link keys 117 and 119 according to their encryption algorithms 109 and 111. The link keys 117 and 119 include information generated using a PIN number shared between the first and second devices 101 and 103. That is, the encryption algorithm 109 of the first device 101 generates a first authentication response string (SRES1) using the BD_ADDR 113, the received AU_RAND 115, and the link key 117 of the first device 101, and the encryption algorithm 111 of the second device 103 generates a second authentication response string (SRES2) using the received BD_ADDR 113, the AU_RAND 115, and the link key 119 of the second device 103.

A comparator of the second device 103 compares SRES1 and SRES2 in step 121. If SRES1 and SRES2 are identical, a P2P connection is established in step 123. If SRES1 and SRES2 are different, the P2P connection setup procedure is terminated in step 125.

For P2P communications, MS_D operates in a reception waiting mode in order to receive a P2P connection setup request. The reception waiting mode refers to a mode in which MS_D keeps its reception sensor activated to receive the P2P connection setup request, thus unnecessarily consuming power.

In addition, the P2P communications require a preliminary agreement between MS_S and MS_D. To make the agreement, MS_S transmits its unique Media Access Control (MAC) address, for example, BD_ADDR to MS_D so that MS_D can identify MS_S. During the transmission, the unique identification information of MS_S is exposed to neighbor BSs, thereby risking the security of the unique identification information.

SUMMARY OF THE INVENTION

An aspect of the present invention is to address at least the above-mentioned problems and/or disadvantages and to provide at least the advantages described below. Accordingly, an aspect of the present invention is to provide a method and system for establishing P2P communications between MSs to enable direct communications there between while in a cellular communication system.

In accordance with an aspect of the present invention, a method for establishing a P2P connection between MSs in a communication system is provided. The method includes a first MS that transmits a request signal requesting P2P communications with a second MS and a unique identification number of the second MS to a BS, receives from the BS a CID of the second MS allocated by the BS and transmission information required for initial synchronization of the P2P communications in response to the request signal, acquires synchronization with the second MS using the CID of the second MS and the transmission information, and establishes a P2P connection with the second MS.

In accordance with another aspect of the present invention, a method for establishing a P2P connection between MSs in a BS in a communication system is provided. The method includes a BS that receives a request signal requesting P2P communications with a second MS and a unique identification number of the second MS from a first MS, and transmits a CID of the first MS and transmission information required for synchronization of the P2P communications to the first MS in response to the request signal, and transmits a CID of the second MS and the transmission information to the second MS.

In accordance with a further aspect of exemplary embodiments of the present invention, a communication system is provided. The system includes a first MS, a second MS, and a BS for communicating with the first MS and the second MS. The first MS transmits a request signal requesting P2P communications with the second MS and a unique identification number of the second MS to the BS, receives from the BS a CID of the second MS allocated by the BS and transmission information required for initial synchronization of the P2P communications in response to the request signal, acquires synchronization with the second MS using the CID of the second MS and the transmission information, and establishes a P2P connection with the second MS.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention provide a method and system for establishing a P2P connection between MSs so that they can communicate directly while in a cellular communication system.

Figure 1:
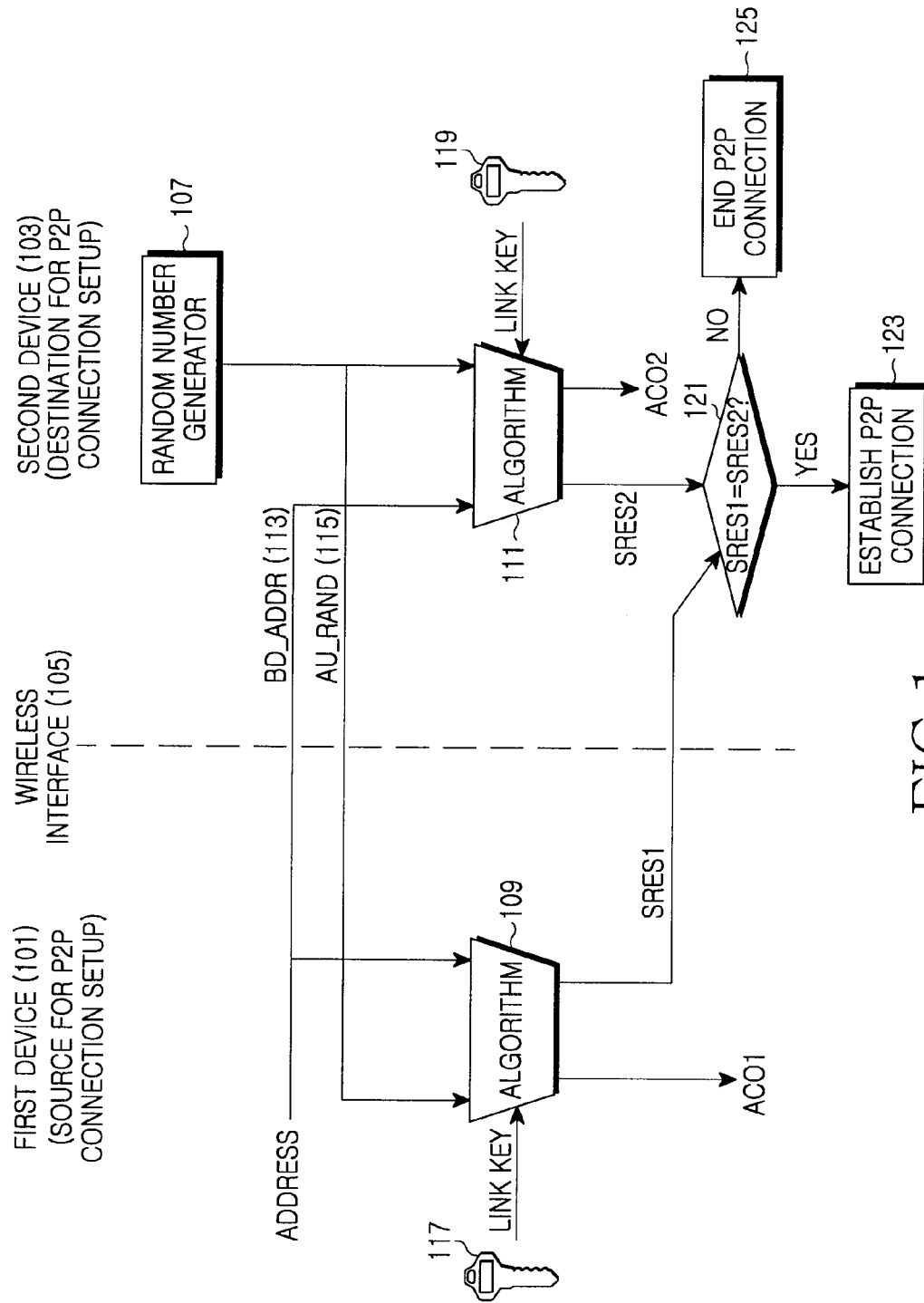
FIG. 1 illustrates a conventional operation for establishing a P2P connection using Bluetooth by a cellular-mode MS in a cellular communication system.
Figure 2:
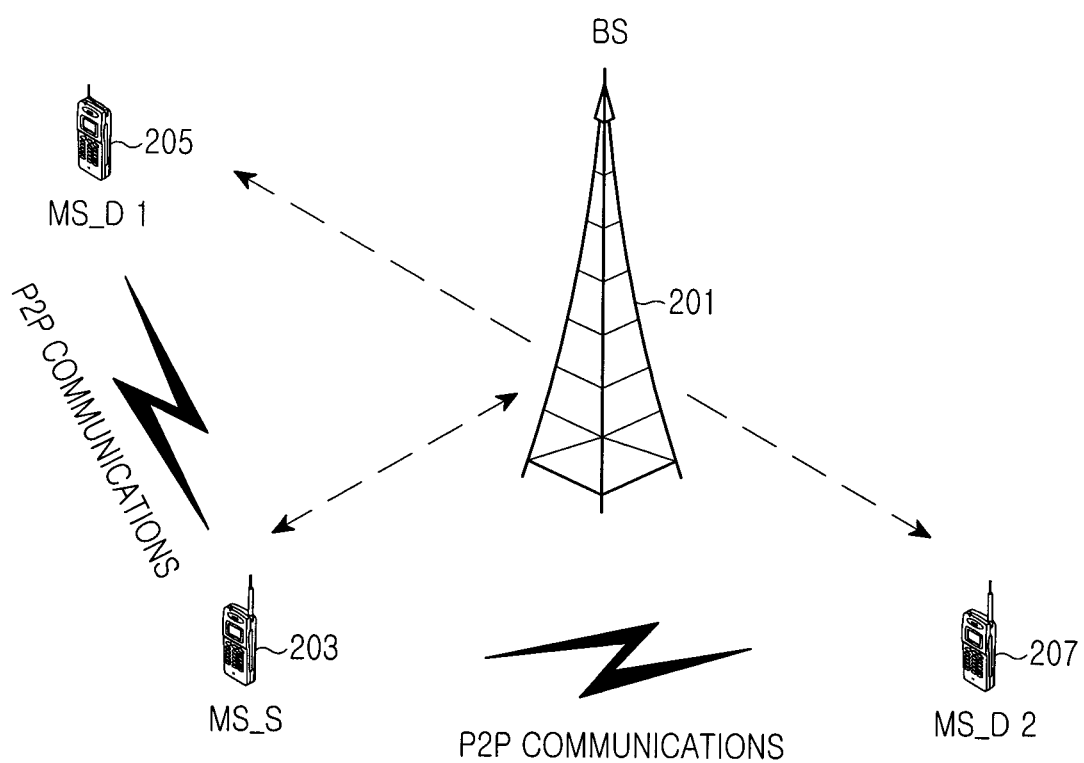
FIG. 2 illustrates both cellular communications and P2P communications in a communication system according to an exemplary embodiment of the present invention.

FIG. 2 illustrates both cellular communications and P2P communications in a communication system according to an exemplary embodiment of the present invention.

Referring to FIG. 2, the communication system includes a BS 201, a source MS 203 (MS_S), a first destination MS 205 (MS_D 1), and a second destination MS 207 (MS_D 2).

MS_S performs cellular communications with MS_D 1 and MS_D 2 through the BS 201. Meanwhile, if MS_D 1 and MS_D 2 are within a system-set distance, that is, within a maximum distance to which a signal from MS_S can reach, MS_S can communicate with MS_D 1 and MS_D 2 by P2P.

However, to establish P2P communication in a cellular communication system, a P2P connection needs to be set up between MS_S and MS_D 1 or between MS_S and MS_D 2.

Figure 3:
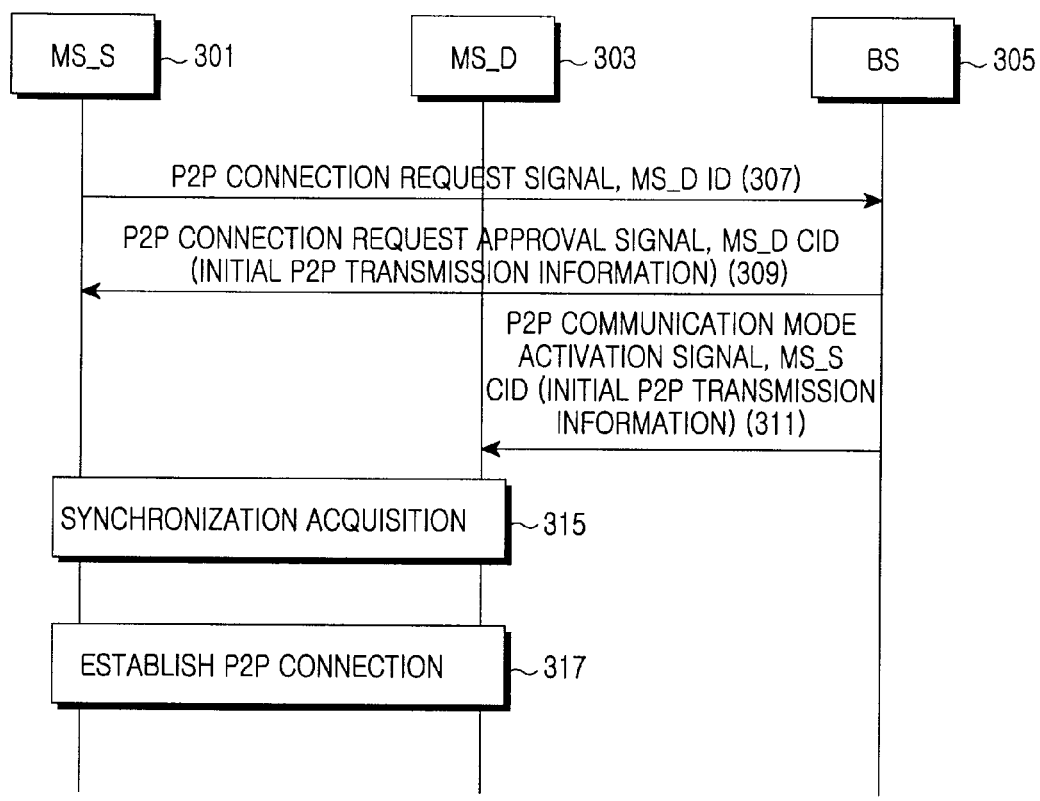
FIG. 3 is a diagram illustrating a signal flow for a P2P connection setup procedure in a communication system according to an exemplary embodiment of the present invention.

FIG. 3 is a diagram illustrating a signal flow for a P2P connection setup procedure in a communication system according to an exemplary embodiment of the present invention.

Referring to FIG. 3, the communication system includes a source MS 301 (MS_S), a destination MS 303 (MS_D), and a BS 305. While only one MS is shown in FIG. 3 for the sake of convenience, it is to be appreciated that the present invention is operable with a plurality of MS_Ds.

Upon the generation of data to be transmitted by P2P communications (P2P data), MS_S transmits a P2P connection request signal and an Identifier (ID) of MS_D to the BS 305 in step 307. The ID is a unique number that identifies MS_D. For example, the ID can be a telephone number, a fixed Internet Protocol (IP), an e-mail address, or the like.

The BS 305 transmits a P2P connection request approval signal and a Connection ID (CID) of MS_D detected by the received ID of MS_D to MS_S in step 309. Also, the BS 305 transmits to MS_D a CID of MS_S and a P2P communication mode activation signal for activating a transceiver sensor of MS_D so that MS_D can transmit and receive a signal to and from MS_S by P2P communications in step 311. Then MS_D activates its transceiver sensor and awaits reception of the P2P connection request signal from MS_S.

In steps 309 and 311, the BS 305 also transmits initial P2P transmission information to MS_S and MS_D. The initial P2P transmission information includes information that enables more efficient synchronization between MS_S and MS_D based on a synchronization signal. The initial P2P transmission information includes a transmission time interval, a transmission sequence, a transmission frequency band, a transmission channel index, and the like.

For example, if the initial P2P transmission information includes information about a transmission time interval of a synchronization signal, MS_S and MS_D can transmit and receive signals only during a preset transmission time interval. In this manner, synchronization is acquired based on the P2P transmission information and thus accurate synchronization is possible while consuming less power. While the BS 305 transmits the initial P2P transmission information to MS_S and MS_D in the exemplary embodiment of the present invention, the initial P2P transmission information may not be transmitted depending on system conditions or parameters.

Meanwhile, MS_S and MS_D generate synchronization signals using their CIDs and exchange the synchronization signals with each other based on the initial P2P transmission information. Then MS_D and MS_S acquire synchronization using the synchronization signals in step 315. MS_S establishes a P2P connection with MS_D, thus establishing P2P communications in step 317.

To be more specific about the synchronization acquisition between MS_S and MS_D, MS_S generates a synchronization signal by attaching its CID to a preset Pseudo Noise (PN) sequence of a preset length and transmits the synchronization signal to MS_D at a transmission frequency band F1 during a transmission time interval T1. Also, MS_S can transmit its CID on a separately procured channel, a control channel, an existing common channel, a synchronization channel or the like.

MS_D correlates the received synchronization signal with the preset PN sequence. Then MS_D determines a time with a maximum correlation to be a reception time and checks the CID received along with the PN sequence. If the received CID is identical to the CID of MS_S received in step 311, MS_D completes the synchronization acquisition. However, if the CIDs are different, MS_D receives the next synchronization signal and repeats the above-described procedure, or notifies the BS 305 of the failed synchronization.

After the reception time synchronization, MS_D generates a synchronization signal by attaching its CID to the PN sequence in the same manner and transmits it at a transmission frequency band F1 in a transmission time interval T2 to MS_S. MS_S correlates the received synchronization signal with the preset PN sequence. Then MS_S determines a time with a maximum correlation to be its reception time and checks the CID received along with the PN sequence. If the received CID is identical to the CID of MS_D received in step 309, MS_S completes the synchronization acquisition. Then, MS_S communicates with MS_D. While a synchronization signal is generated by attaching a CID to a PN sequence for illustrative purposes, it can be generated using the PN sequence alone. MS_S and MS_D which have received the synchronization signals can identify their other parties by exchanging their CIDs with each other after setting a time with a maximum correlation as a reception time. If the identified other parties are parties in which communication is desired with, they can exchange ACKnowledgment (ACK) signals. If the identified other parties are not parties in which communication is desired with, they can request synchronization re-acquisition to the BS 305.

In the illustrated case of FIG. 3, the BS 305 approves the P2P connection request of MS_S. If the BS 305 rejects the P2P connection request of MS_S, it ends the P2P connection setup procedure by transmitting a P2P connection request rejection signal. Notably, the synchronization acquisition between MS_S and MS_D is compliant with a preset radio communication protocol, such as 802.16, Code Division Multiple Access (CDMA), Global System for Mobile communication (GSM), and the like.

Figure 4:
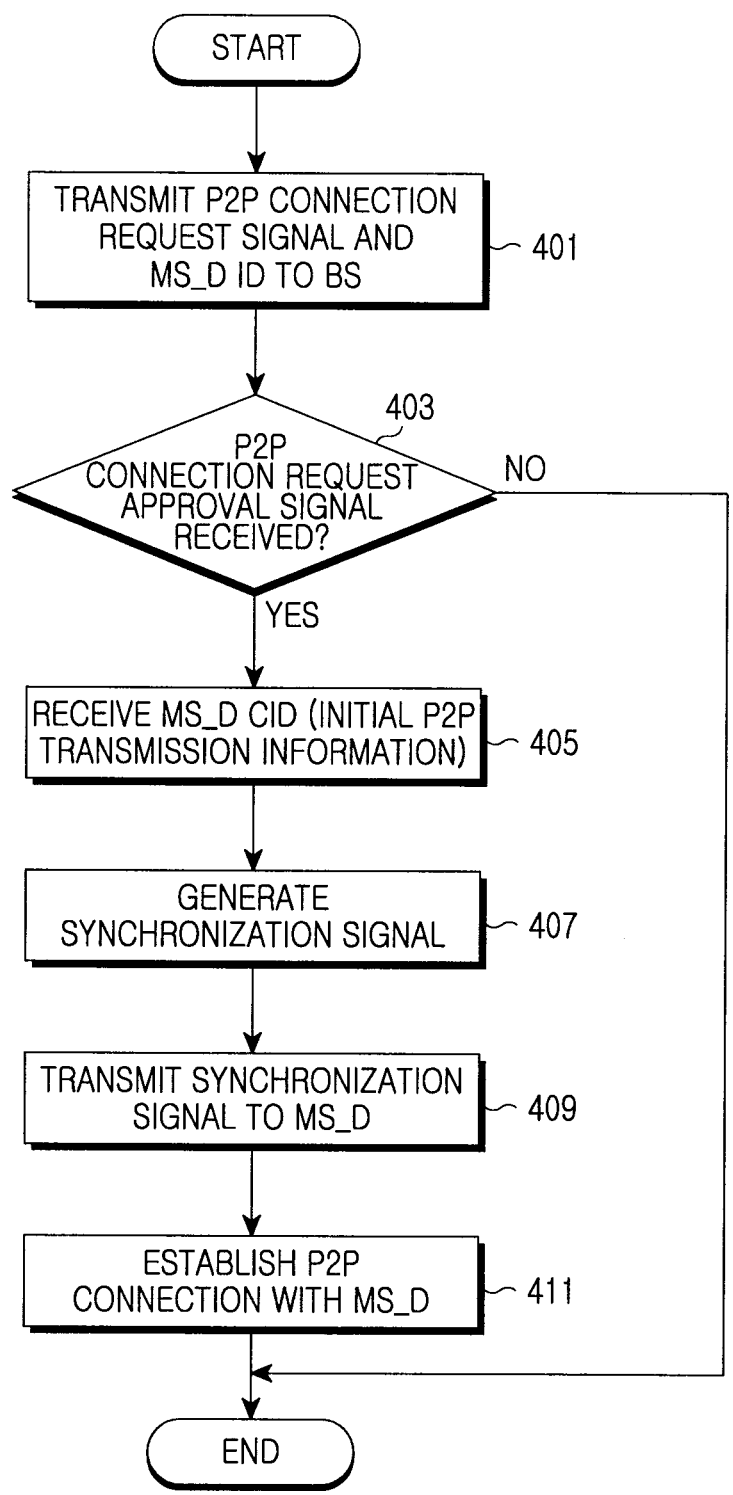
FIG. 4 is a flowchart illustrating a P2P connection setup operation of MS_S in a communication system according to an exemplary embodiment of the present invention.

FIG. 4 is a flowchart illustrating a P2P connection setup operation of MS_S in a communication system according to an exemplary embodiment of the present invention.

Referring to FIG. 4, upon the generation of data to be transmitted to MS_D, MS_S transmits a P2P connection request signal and an ID of MS_D to the BS in step 401. MS_S monitors for a reception of a P2P connection request approval signal from the BS in step 403. Upon receipt of the P2P connection request approval signal, MS_S receives a CID of MS_D and initial P2P transmission information from the BS in step 405.

In step 407, MS_S generates a synchronization signal using its CID, for synchronization to MS_D. MS_S transmits the synchronization signal using the initial P2P transmission information to MS_D in step 409 and establishes a P2P connection to MS_D in step 411.

Figure 5:
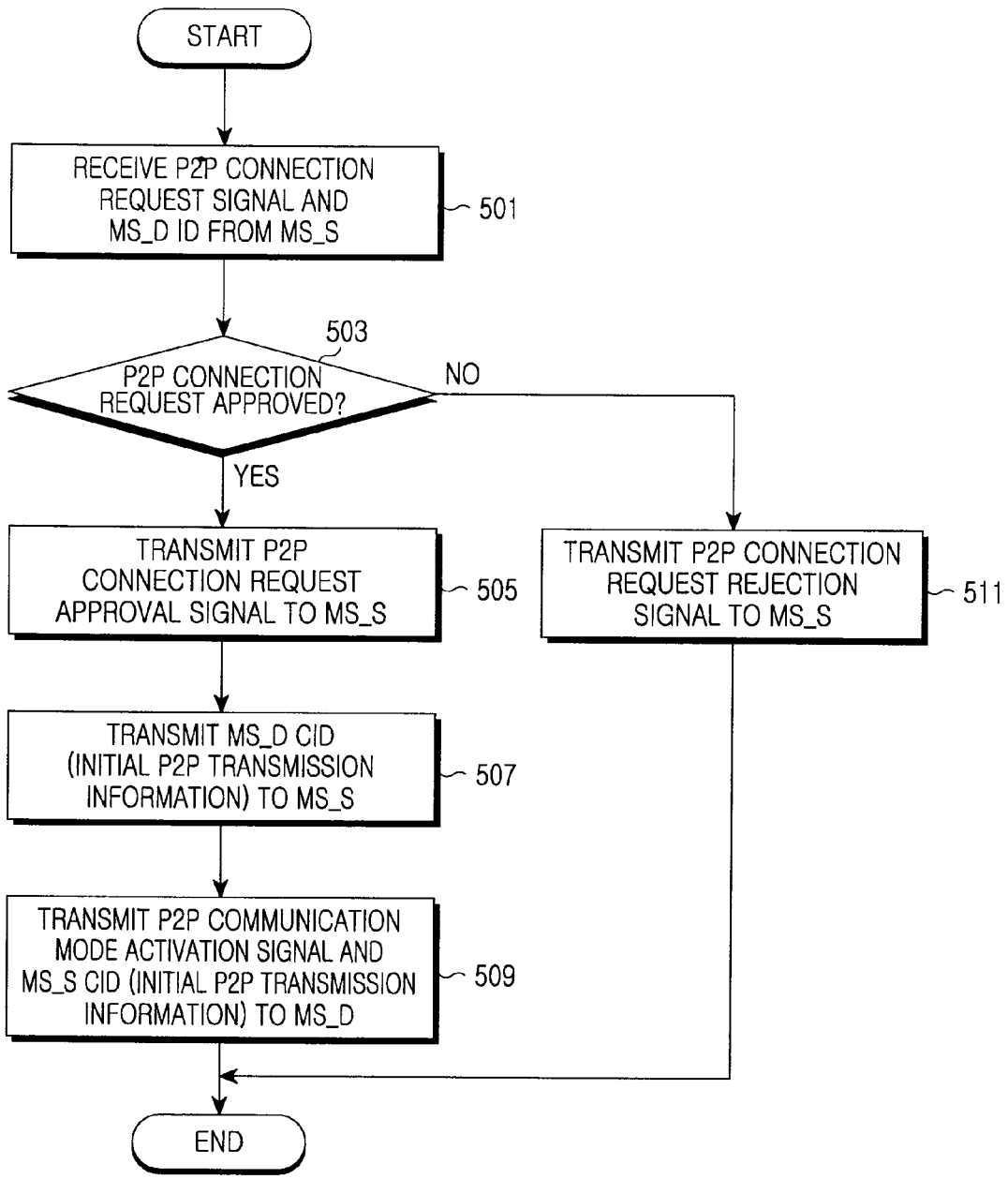
FIG. 5 is a flowchart illustrating an operation of a BS for establishing a P2P connection between MS_S and MS_D in a communication system according to an exemplary embodiment of the present invention.

FIG. 5 is a flowchart illustrating an operation of a BS for establishing a P2P connection between MS_S and MS_D in the communication system according to an exemplary embodiment of the present invention.

Referring to FIG. 5, the BS receives a P2P connection request signal requesting a P2P connection to MS_D and an ID of MS_D from MS_S in step 501 and determines whether to approve the P2P connection request in step 503. When approving the P2P connection request, the BS goes to step 505 and otherwise, it goes to step 511. In step 511, the BS transmits a P2P connection request rejection signal to MS_S.

Meanwhile, in step 505 the BS transmits a P2P connection request approval signal to MS_S. The BS then transmits a CID of MS_D and initial P2P transmission information to MS_S in step 507. In step 509, the BS transmits to MS_D a P2P communication mode activation signal for activating a transceiver sensor that transmits and receives P2P signals to and from MS_S, a CID of MS_S, and the initial P2P transmission information.

Figure 6:
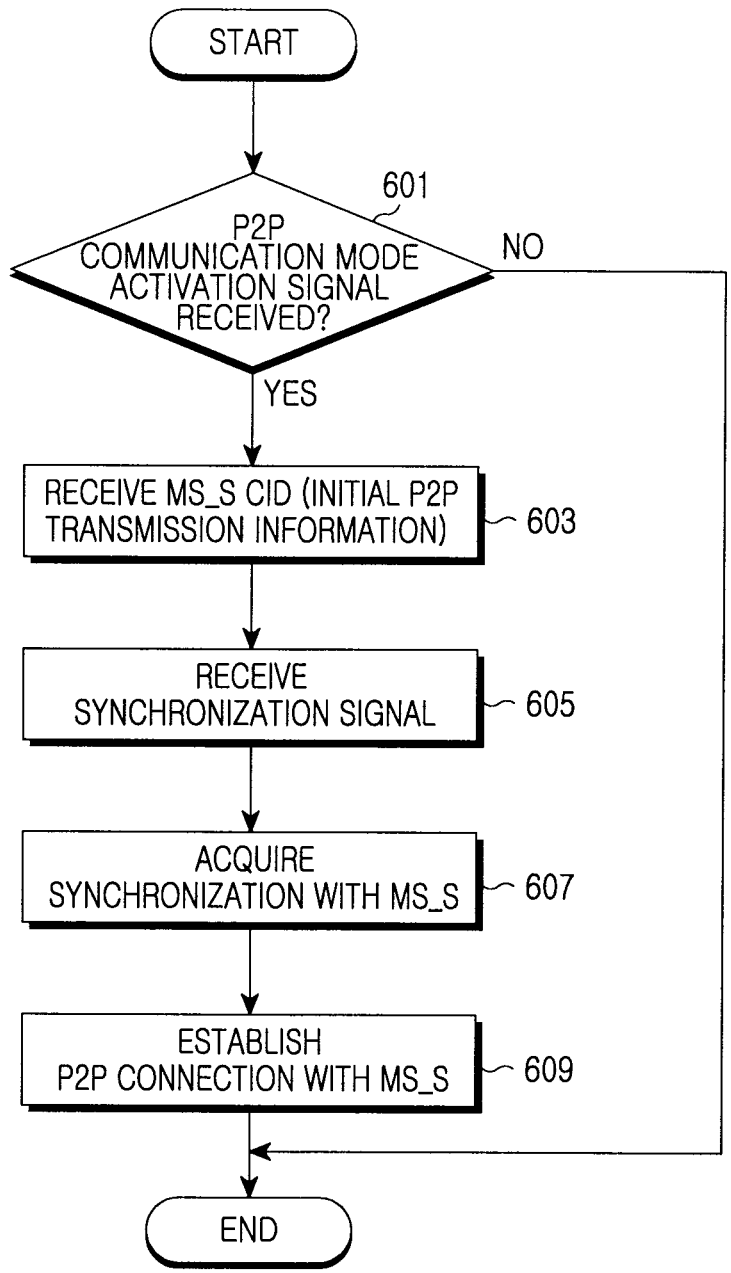
FIG. 6 is a flowchart illustrating a P2P connection setup operation of MS_S in a communication system according to an exemplary embodiment of the present invention.

FIG. 6 is a flowchart illustrating a P2P connection setup operation of MS_S in a communication system according to an exemplary embodiment of the present invention.

Referring to FIG. 6, MS_D monitors for a reception of a P2P communication mode activation signal for activating a transceiver sensor that transmits and receives P2P signals to and from MS_S in step 601. Upon receipt of the P2P communication mode activation signal, MS_D receive a CID of MS_S and initial P2P transmission information from the BS in step 603 and receives a synchronization signal from MS_S in step 605. In step 607, MS_D acquires synchronization to MS_S based on the received synchronization signal. MS_D then establishes a P2P connection to MS_S in step 609.

As is apparent from the above description, exemplary embodiments of the present invention advantageously save power since MS_S generates a synchronization signal for synchronization to MS_D and transmits the synchronization signal to MS_D based on initial P2P transmission information in a cellular communication system. Also, because MS_D can identify MS_S without receiving unique information of MS_S, communications become more secure and more efficient.

While the invention has been shown and described with reference to certain exemplary embodiments thereof, it will be understood by those skilled in the art that various changes in form and details may be made therein without departing from the spirit and scope of the present invention as defined by the appended claims and their equivalents.

What is claimed is:

1. A method for establishing a Peer-To-Peer (P2P) connection between Mobile Stations (MSs) in a communication system, the method comprising:

transmitting a request signal requesting P2P communications with a second MS and a unique identification number of the second MS to a Base Station (BS), by a first MS;

receiving from the BS a Connection IDentifier (CID) of the second MS allocated by the BS and transmission information required for initial synchronization of the P2P communications in response to the request signal, by the first MS;

acquiring synchronization with the second MS using a synchronization signal generated by attaching the CID of the second MS to a Pseudo-Noise (PN) sequence and the transmission information, by the first MS; and establishing a P2P connection with the second MS, by the first MS, wherein the CID of the second MS is detected by using the unique identification number.

2. The method of claim 1, wherein the transmission information includes information about at least one of a time interval for transmission of the synchronization signal for the acquiring of the synchronization, the PN sequence, a frequency band, and a channel index.

3. The method of claim 1, wherein the acquiring of the synchronization comprises:

generating a first synchronization signal for the acquiring of the synchronization and transmitting the first synchronization signal using the transmission information to the second MS, by the first MS;

receiving a second synchronization signal from the second MS, by the first MS, after the second MS acquires synchronization with the first MS using the first synchronization signal;

correlating a PN sequence included in the second synchronization signal with a PN sequence included in the transmission information, by the first MS;

setting a time with a maximum correlation as a reception time of the first MS, by the first MS; and determining that the acquisition of the synchronization with the second MS is successful, by the first MS, if a CID included in the second synchronization signal is identical to the CID of the second MS.

4. The method of claim 1, wherein the acquiring of the synchronization comprises:
   receiving the synchronization signal from the second MS, by the first MS;
   correlating a PN sequence included in the synchronization signal with a PN sequence included in the transmission information, by the first MS;
   setting a time with a maximum correlation as a reception time of the first MS, by the first MS;
   transmitting a CID of the first MS to the second MS, by the first MS;
   receiving a CID from the second MS, by the first MS; and
   determining that the acquisition of the synchronization with the second MS is successful by the first MS, if the received CID is identical to the CID of the second MS.

5. The method of claim 1, wherein the unique identification number comprises at least one of a telephone number, a fixed Internet Protocol (IP), and an e-mail address.

6. The method of claim 1, further comprising receiving from the BS a P2P communications approval signal in response to the request signal, by the first MS.

7. A method for establishing a Peer-To-Peer (P2P) connection between Mobile Stations (MSs) in a Base Station (BS) in a communication system, the method comprising:
   receiving a request signal requesting P2P communications with a second MS and a unique identification number of the second MS, from a first MS; and
   transmitting a first synchronization signal generated by attaching a Connection IDentifier (CID) of the second MS to a Pseudo-Noise (PN) sequence and transmission information required for synchronization of the P2P communications to the first MS; and
   transmitting a second synchronization signal generated by attaching a CID of the first MS to the PN sequence and the transmission information to the second MS,
   wherein the CID of the second MS is detected by using the unique identification number.

8. The method of claim 7, wherein the transmission information includes information about at least one of a time interval for transmission of a synchronization signal for acquiring the synchronization, the PN sequence, a frequency band, and a channel index.

9. The method of claim 7, wherein the unique identification number comprises at least one of a telephone number, a fixed Internet Protocol (IP), and an e-mail address.

10. A first Mobile Station (MS) apparatus for establishing a Peer-To-Peer (P2P) connection with a second mobile station in a communication system, the apparatus comprising:
    a transmitter for transmitting a request signal requesting P2P communications with the second MS and a unique identification number of the second MS to a Base Station (BS);
    a receiver for receiving from the BS a Connection IDentifier (CID) of the second MS allocated by the BS and transmission information required for initial synchronization of the P2P communications in response to the request signal; and
    a controller for acquiring synchronization with the second MS using a synchronization signal generated by attaching the CID of the second MS to a Pseudo-Noise (PN) sequence and the transmission information and for establishing a P2P connection with the second MS,
    wherein the CID of the second MS is detected by using the unique identification number.

11. The first MS apparatus of claim 10, wherein the transmission information includes information about at least one of a time interval for transmission of the synchronization signal for the acquiring of the synchronization, the PN sequence, a frequency band, and a channel index.

12. The first MS apparatus of claim 10, wherein the controller generates a first synchronization signal for the acquiring of the synchronization, the transmitter transmits the first synchronization signal using the transmission information to the second MS, the receiver receives a second synchronization signal from the second MS after the second MS acquires synchronization with the first MS using the first synchronization signal, and the controller correlates a PN sequence included in the second synchronization signal with a PN sequence included in the transmission information, sets a time with a maximum correlation as a reception time of the first MS, and determines that acquisition of synchronization with the second MS is successful, if a CID included in the second synchronization signal is identical to the CID of the second MS.

13. The first MS apparatus of claim 10, wherein the receiver receives the synchronization signal from the second MS, the controller correlates a PN sequence included in the synchronization signal with a PN sequence included in the transmission information, sets a time with a maximum correlation as a reception time of the first MS, the transmitter transmits a CID of the first MS to the second MS, receives a CID from the second MS, and the controller determines that acquisition of synchronization with the second MS is successful, if the received CID is identical to the CID of the second MS.

14. The first MS apparatus of claim 10, wherein the unique identification number comprises at least one of a telephone number, a fixed Internet Protocol (IP), and an e-mail address.

15. The first MS apparatus of claim 10, wherein the receiver receives a P2P communications approval signal in response to the request signal from the BS.

16. A Base Station (BS) apparatus for establishing a Peer-To-Peer (P2P) connection between Mobile Stations (MSs) in a communication system, the apparatus comprising:
    a receiver for receiving a request signal requesting P2P communications with a second MS and a unique identification number of the second MS, from a first MS; and
    a transmitter for transmitting a first synchronization signal generated by attaching a Connection IDentifier (CID) of the second MS to a Pseudo-Noise (PN) sequence and transmission information required for synchronization of the P2P communications to the first MS for transmitting a second synchronization signal generated by attaching a CID of the first MS to the PN sequence and the transmission information to the second MS,
    wherein the CID of the second MS is detected by using the unique identification number.

17. The BS apparatus of claim 16, wherein the transmission information includes information about at least one of a time interval for transmission of a synchronization signal for acquiring the synchronization, the PN sequence, a frequency band, and a channel index.

18. The BS apparatus of claim 16, wherein the unique identification number comprises at least one of a telephone number, a fixed Internet Protocol (IP), and an e-mail address.

* * * * *